Nov. 13, 1962   J. PAPARELLI   3,063,147
ADJUSTABLE TOOL
Filed July 1, 1959
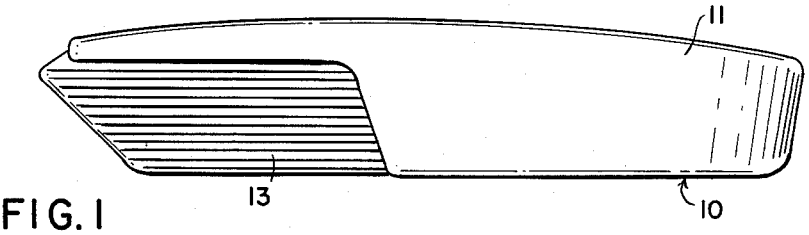
FIG. 1
FIG. 2
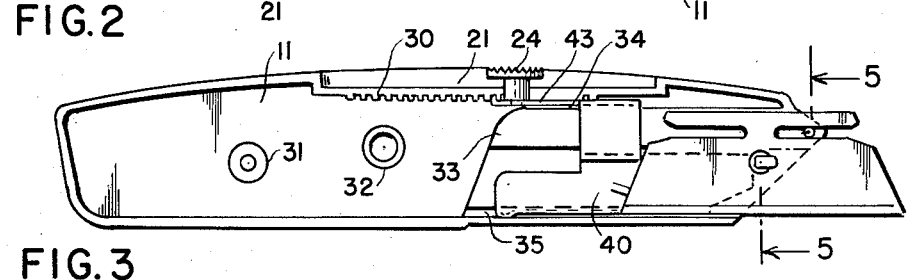
FIG. 3
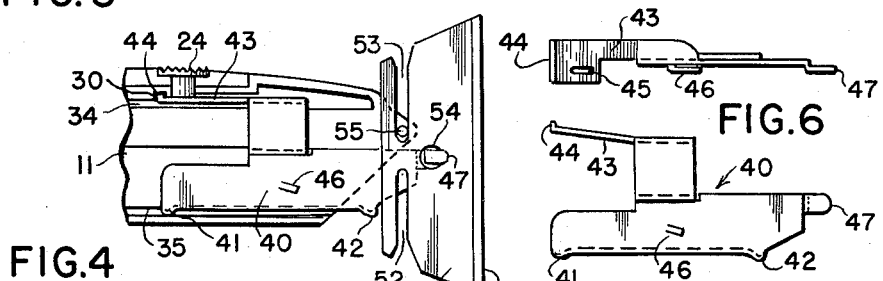
FIG. 4
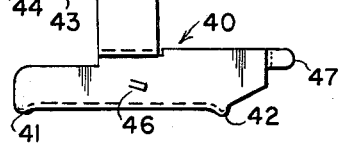
FIG. 6
FIG. 7
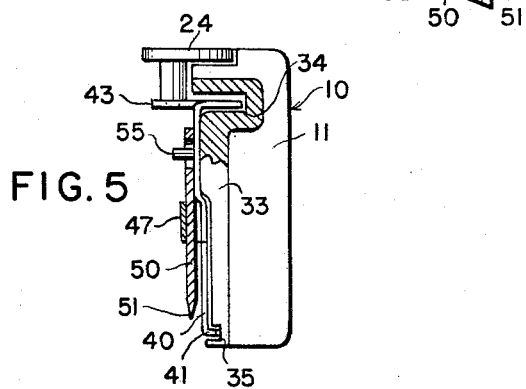
FIG. 5
INVENTOR.
Joseph Paparelli
BY
ATTORNEY 3,063,147
ADJUSTABLE TOOL
Joseph Paparelli, Yonkers, N.Y., assignor to Kastar Incorporated, New York, N.Y., a corporation of New York
Filed July 1, 1959, Ser. No. 824,336
2 Claims. (Cl. 30—154)

This invention relates to an adjustable tool, and more particularly to an adjustable device which may be employed as a cutting and scraping tool, and constitutes a combination retractable knife and scraper.

Although many devices are now available which may be adjusted from a cutting to a scraping instrument, to cause a change in purpose and use, such devices necessitate manual adjustments inherently dangerous to the user, and there is not now available a combination of such cutting and scraping instrumentality which is retractable into a housing.

The present invention obviates complicated and often hazardous operations in the use of a dual purpose device such as that embodied in the present invention.

An object of the present invention is to provide a device which, by simple adjustment, may be positioned to be used as a cutting instrument as well as a scraping instrument, and which is at the same time retractable into a supporting housing.

Another object of the present invention is the provision of a device which may be easily and rapidly adjusted to adapt a cutting blade for performing scraping as well as cutting operations.

A further object of the present invention is the provision of locking means, in connection with a cutting and scraping instrument, in order to avoid inconvenience and danger to the user.

Another object of the present invention is the provision of a device in which a cutting edge may be secured in a plurality of positions.

A further object of the present invention is the provision of a device simple in construction, pleasing to the eye, inexpensive to manufacture, durable and convenient to the user.

In accomplishing the foregoing objects, there is provided a blade or cutting edge, in arrangement and combination of several parts, housed within a handle member, which blade may be projected and retracted therefrom. Improved means is provided for moving and securing said cutting edge in a plurality of predetermined positions, by the use of a novel slide member operated by a slide knob. Means for securely locking the cutting member in a plurality of predetermined positions is further provided.

Other objects, advantages, and inventive characteristics of this new and unique device will become apparent, to those versed in the art, from the following description of a particular embodiment of the invention as illustrated in the drawing, in which like reference characters refer to like parts throughout the several views and in which:

FIG. 1 is a front elevational view of preferred embodiment of the present invention;

FIG. 2 is a top plan view of the present invention;

FIG. 3 is a longitudinal cross sectional view of the embodiment of the invention with one side of the housing removed;

FIG. 4 is a view as in FIG. 3 of one end of the device showing the cutting member extended and in position to be used as a scraper;

FIG. 5 is a cross sectional view taken at line 5—5 of FIG. 3;

FIG. 6 is a top plan view of the slide member; and

FIG. 7 is a plan view of the slide member.

Referring now to the drawing, the preferred embodiment of the retractable cutting device 10, generally comprises a substantially quadrilateral housing, preferably in two sections 11, 12, in parallel relationship. A partially recessed gripping surface 13 upon the outside face of each of the two sections 11, 12 of the housing allows the user to conveniently and comfortably grasp the device 10.

The two sections 11, 12 of the housing, generally rectangular, are integrally connected by a pair of internally threaded extruded portions 31, 32. Within the interior of one housing section 11 serving to receive a pair of screws passing through apertures (not shown), of the opposing housing wall 12 so that each of the housing walls, 11, 12, may be secured in parallel relation. Such housing 11, 12 forms the frame for the device as well as the handle for the user.

Along the top surface of the first housing section 11, and generally in the area designated as the front portion of the device, there is a recessed track 21 aligned with a substantially similar recessed track 22 along the perimeter of a cut-out portion at the top of housing 12. When sections 11, 12 are secured in parallel relation, aperture 23 is formed, with recessed track 21, 22 forming a groove or track along the perimeter of aperture 23, allowing slide knob 24, which projects through aperture 23, lateral movement within the confines of said track.

Generally, at the forward end of the device, the recessed tip of each section defines an aperture 25 through which a cutting member 50 is permitted to protrude.

Upon the inner surface of housing section 11 and along the underside of recessed track 21 a plurality of ratchet stops 30 are provided, defining a plurality of positions which may be assumed by slide knob 24. On the reverse surface of the outer recessed gripping surface 13 a protuberance 33 is formed on the interior surface of each housing section 11, 12, the uppermost part thereof defining a channel or track 34 in apposition to ratchet stops 30 and terminating at the recess defining the forward aperture 25. Along the lower interior edge of housing section 11 a longitudinal extending channel 35, extending within the entire front portion of the device, is adapted to receive a portion of slide member 40 presently to be described.

As a vehicle for retaining, projecting and retracting the cutting member 50, there is provided a slide member 40 of sheet material generally shaped to conform to the protuberance 33 of housing section 11. A plurality of flanges 41, 42 are provided along the lower angular edge of slide member 40 preferably at the front and rear portion thereof, adapted to fit into channel 35. Upon the uppermost part of slide member 40 there is provided a leaf spring portion 43 having an ear 44 adapted to engage ratchet stops 30 and an aperture 45 through which the shank of slide knob 24 may be terminally engaged. The leaf spring portion 43 is generally perpendicular to the body of slide member 40 so as to overlap into and be guided along track 34 in its horizontal traversal of the front portion of the device 10. Such leaf spring 43 may be formed separately from the body of slide member 40 or may be formed as an integral part of said member 40.

Medially the body of slide member 40 there is provided a lug 46 adapted to position and retain a cutting member 50 in juxtaposition with slide member 40. A further lug 47 medially the forward end of the slide member 40, adapted to be inserted within a cutting member 50 serves to retain such cutting member in cooperation with medial lug 46. A relatively thin cutting member 50, generally having an isosceles trapezoidal configuration, has the longest side thereof sharpened to define a cutting edge 51. Within the area opposite the cutting edge 51 and extending from either of its sides, inwardly, there is provided elongated slots 52, 53. Medially the body of blade member 50 an aperture 54 is adapted to receive forward lug 47 of slide member 40. A circular lug or boss 55 protruding from housing section 11 is adapted to interengage with slot 53 when the blade is placed within the device. Thus when blade member 50 is placed within the device 10 forward lug 47 is interengaged with aperture 54, circular lug 55 lodging within slot 53 and one side of blade 50 held in place by medial lug 46 as blade member 50 is placed against it.

In operating the device, the slide knob 24 is normally as far back from the forward part of the device as possible, with cutting member 50 completely concealed within the housing. When it is desired to use the instrument as a cutting device, slide knob 24 is depressed and pushed forward, thus ejecting cutting member 50 from within the housing. When a desired position of such cutting member 50 is reached, the slide knob 24 is released, allowing ear 44 on leaf spring 43 of the slide member 40 to be lodged in a ratchet stop 30 thereby securing the blade in that position.

If the user desires the instrument to be used for scraping purposes, the slide knob 24 is depressed and moved as far forward as possible. The slide member 40 will thus carry the blade member 50 forward, until circular lug 55 traverses the slot 53 to its innermost limits at which point the forward propulsion supplied by the user upon the slide 40 will cause the blade member 50 to pivot upon circular lug 55 causing blade member 50 to assume a vertical position. After use, when it is again desired to place blade member 50 in a concealed position within the housing, the slide knob 24 is again depressed, and drawn rearward, with blade member 50 traversing the reverse path.

Despite the fact that one embodiment of the invention has been illustrated, it is the intention herein that this invention not be limited to such embodiment, but rather it will be understood that though changed and modified, an altered structure will still fall within the ambit of this invention. For instance, it is obvious that instead of the cutting or scraping blade, there may be provided a serrated or saw blade which can be inserted in the handle in place of the blade.

I claim:

1. A combination retractable knife and scraper comprising a housing having an aperture at the front end extending into the interior thereof; and having a medial aperture at the top of said housing; the inner surface of said housing having a protuberance thereon; slide traversal means along the top and bottom of said protuberance; a slide member engageable in said slide traversal means for longitudinal movement therealong; a cutting element having at least one slot in the upper portion thereof; pivotal retaining means upon said slide member adapted to pivotally secure said cutting element in juxtaposition therewith; a plurality of spaced means within said housing for positioning said slide member in each of several positions; detent means on said slide member engageable in said spaced means; means projecting exteriorly through said medial aperture from said detent means for moving said slide member and said cutting element to a plurality of longitudinal positions relative to said housing to adapt said cutting element to serve as a cutting tool; and pivoting means within and on said housing in the forward end thereof engageable within the longitudinal slot of said cutting element and adapted to pivot said cutting element at right angles relative to said housing to serve as a scraping tool.

2. A combination retractable knife and scraper comprising a housing having an aperture at the front end extending into the interior thereof; and having medial aperture at the top of said housing; the inner surface of said housing having slide traversal means formed by an upper channel along the top and a lower channel along the bottom of the inner surface of said housing; a slide member engageable in said slide traversal means; a cutting element having at least one slot in the upper portion thereof, and having a central aperture therein; a medially and forwardly located lug upon said slide member adapted to engage said central aperture and pivotally secure said cutting element in juxtaposition therewith; a plurality of ratchet stops within said housing for positioning said slide member in each of several positions; a leaf spring having an ear on said slide member engageable in said ratchet stops, a shank having a knob thereon projecting exteriorly through said medial aperture from said leaf spring for moving said slide member and said cutting element in a plurality of longitudinal positions relative to said housing to adapt said cutting member to serve as a cutting tool; and a circular lug within said housing in the forward end thereof engageable within the longitudinal slot of said cutting member and adapted to pivot said cutting member at right angles relative to said housing to serve as a scraping tool.

References Cited in the file of this patent

UNITED STATES PATENTS

| | | |
|---|---|---|
| 2,242,900 | Bender | May 20, 1941 |
| 2,578,896 | Moore | Dec. 18, 1951 |
| 2,870,537 | Ortner | Jan. 27, 1959 |